(No Model.)
P. D. HORTON.
FLY TRAP.
No. 321,437. Patented July 7, 1885.
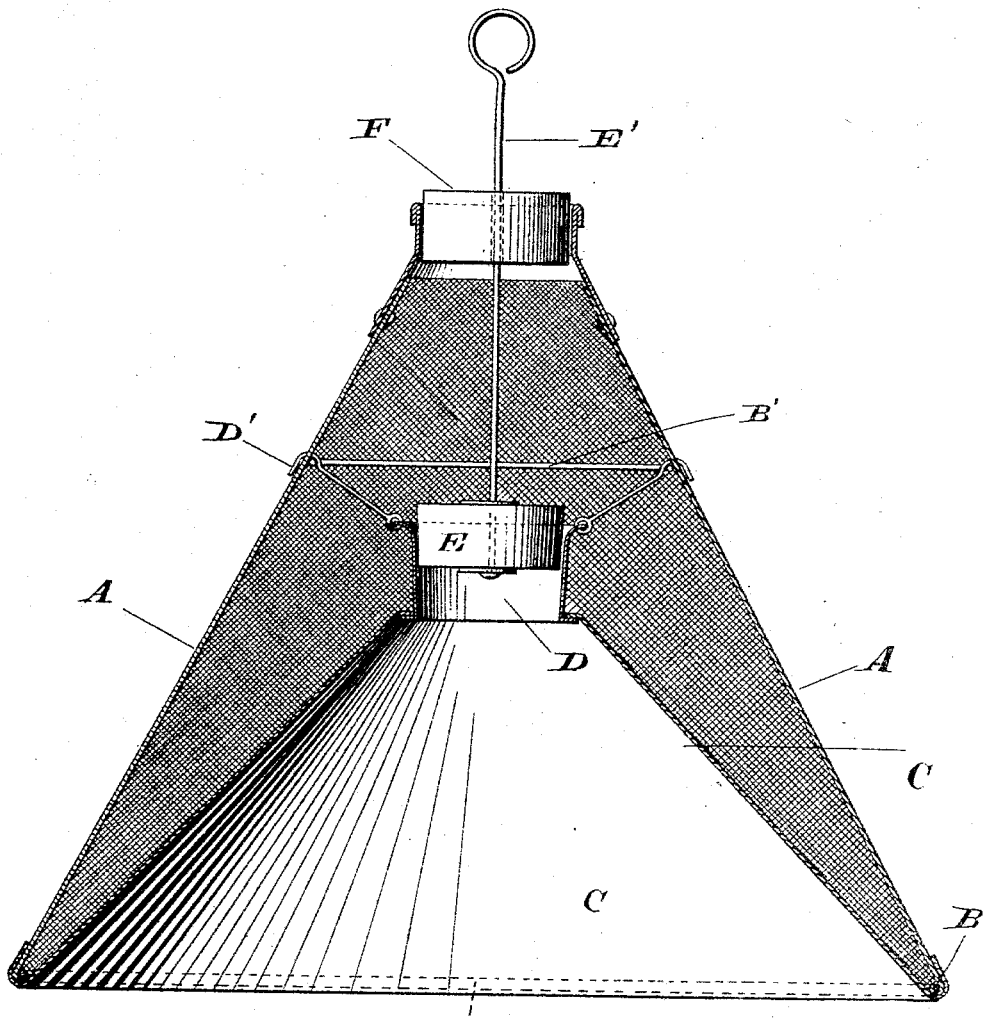
Witnesses
Wilmer Bradford
Joseph Cooney
Inventor
Peter D. Horton
By C. W. M. Smith
Attorney

UNITED STATES PATENT OFFICE.

PETER D. HORTON, OF OAKLAND, CALIFORNIA.

FLY-TRAP.

SPECIFICATION forming part of Letters Patent No. 321,437, dated July 7, 1885.

Application filed September 3, 1884. (No model.)

*To all whom it may concern:*

Be it known that I, PETER D. HORTON, a citizen of the United States, residing at Oakland, in the county of Alameda and State of California, have invented a new and useful Fly-Trap, of which the following is a specification.

The object of my invention is to provide a means for capturing or entrapping flies or other insects in quantities, and wheresover they are collected in a body. I accomplish this object by the means illustrated in the accompanying drawing, which is a section in elevation of my invention.

In carrying out my invention, I construct of wire-gauze or netting a funnel-shaped basket, A, suitably strengthened by supporting-rods B. Within this basket I place a smaller funnel, C, which latter is suitably connected at the base to the base of the larger funnel, as shown. The interior face of this second or smaller funnel is lined with dark material, so as to exclude the light, and for this purpose dark-colored or black cambric or muslin will answer. A steadying rim or ring, D, is connected to the apex or top of the smaller funnel, which is held in position by hooks D', connected to the outer funnel. This ring is provided with a stopper, E, to which a wire handle, E', is connected, and which extends up through a stopper, F, at the top of the main or larger funnel, terminating in a ring. The object of these plugs or stoppers is to keep the openings at the top of both of the funnels closed, as desired, or to remove them when necessary, to entrap or destroy the contents of the trap, which is accomplished in the following manner, to wit: The base of the trap is made large enough to be placed over a milk-pan or other vessel, where the flies are most likely to congregate, and when it is so placed over any such vessel or locality where the flies are congregated, the flies are confined in a dark chamber. Then, by means of the handle E', the stopper E can be drawn up out of the ring D, and made to rest upon the cross-bar B'. Light will thus be admitted to the dark chamber, and the flies, attracted by the light, will pass up through the opening in the top of the smaller funnel into the chamber of the larger funnel, when the stopper is removed from its resting-place, and the opening closed in the lower funnel. Then the stopper at the apex or end of the larger funnel is withdrawn, and the flies in the chamber destroyed by any suitable means, as scalding, &c. Thus it will be seen that the trap may be used at any point where a larger or smaller body of flies collect, and immediate and constant results of destruction be had without awaiting the slow process of collection or congregation of the insects, as by other devices now employed, and that all of these pests may be speedily captured and destroyed at whatsoever point they may congregate.

Having thus described my invention, what I claim, and desire to secure by Letters Patent, is—

In a fly-trap, the combination of an outer conical basket having an opening at its apex closed by a removable plug, and an interior smaller funnel-shaped chamber with an opening at its top, also closed by a removable plug, all arranged and adapted to be placed over a vessel or over any locality where the insects collect or congregate for entrapping the same, substantially as shown and described.

In testimony that I claim the foregoing I have hereunto set my hand and seal.

PETER D. HORTON. [L. S.]

Witnesses:
C. W. M. SMITH,
WILMER BRADFORD.